(12) United States Patent
Takemura et al.

(10) Patent No.: US 7,465,772 B2
(45) Date of Patent: Dec. 16, 2008

(54) APPARATUS FOR CONTINUOUS POLYMERIZATION OF OLEFIN, METHOD FOR TRANSFERRING A POLYMER POWDER, AND METHOD FOR CONTINUOUS POLYMERIZATION OF OLEFIN

(75) Inventors: Kazuyuki Takemura, Ichihara (JP); Yoichi Konno, Ichihara (JP); Kazuki Wakamatsu, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 387 days.

(21) Appl. No.: 11/180,725

(22) Filed: Jul. 14, 2005

(65) Prior Publication Data

US 2006/0014914 A1    Jan. 19, 2006

(30) Foreign Application Priority Data

Jul. 16, 2004    (JP)    ............... 2004-209763

(51) Int. Cl.
  *C08F 2/34*    (2006.01)
  *B01J 19/24*    (2006.01)
  *F26B 17/10*    (2006.01)

(52) U.S. Cl. .................. 526/65; 526/88; 526/920; 422/134; 34/582; 34/583

(58) Field of Classification Search .......... 34/582, 34/583; 422/134, 135; 526/65, 88, 920
See application file for complete search history.

(56) References Cited

U.S. PATENT DOCUMENTS 2,690,962 A * 10/1954 Clarke .................. 422/143

4,420,592 A * 12/1983 Kato et al. .................. 526/65
4,621,952 A    11/1986 Aronson (Continued)

FOREIGN PATENT DOCUMENTS

EP    1 040 868 A    10/2000

(Continued)

OTHER PUBLICATIONS

Derwent Abstract Accession No. 2000-232972/20, A35 (corresponds to JP2000-053707 which was previously submitted on Jul. 14, 2005).

(Continued)

*Primary Examiner*—Fred M Teskin
(74) *Attorney, Agent, or Firm*—Sughrue Mion, PLLC

(57) ABSTRACT

An apparatus and method for continuous polymerization of olefin(s), and a method for transferring a polymer powder from one reactor to another in the apparatus are disclosed. The apparatus includes a plurality of serially disposed gas-phase polymerization reactors including a combination of an upstream and downstream reactors and a gas exchange vessel disposed between both reactors. The gas exchange vessel is connected to the upstream and downstream reactors by a first and second transfer conduits, respectively. The gas exchange vessel has a gas distributor plate therein which partitions the gas exchange vessel into an upper section having a gas exchange chamber and a lower section. In the gas exchange chamber, the gas transferred from the upstream reactor together with a polymer powder is exchange at least partly with fresh gas introduced through the gas distributor plate via the lower section. The polymer powder is then transferred to the downstream reactor.

7 Claims, 2 Drawing Sheets

U.S. PATENT DOCUMENTS 4,902,483 A    2/1990   Raufast
5,928,612 A    7/1999   Chinh
6,705,025 B2 *   3/2004   Werner et al. .................. 34/594

FOREIGN PATENT DOCUMENTS

JP           3-153708   A     7/1991
JP           2000-53707   A     2/2000

OTHER PUBLICATIONS

Patent Abstracts of Japan, Publication No. 2003-277412 A, published Oct. 2, 2003.

* cited by examiner

APPARATUS FOR CONTINUOUS POLYMERIZATION OF OLEFIN, METHOD FOR TRANSFERRING A POLYMER POWDER, AND METHOD FOR CONTINUOUS POLYMERIZATION OF OLEFIN

BACKGROUND OF THE INVENTION

1. Field of the Invention

The present invention relates to an apparatus for continuous polymerization of olefin(s) including a plurality of serially-disposed gas-phase polymerization reactors, in which a gas accompanying a polymer powder produced in an upstream reactor is exchanged with another gas and then the polymer powder can be transferred intermittently or continuously to a downstream reactor. The present invention relates also to a method for transferring a polymer powder and a method for continuous polymerization of olefin(s) using the apparatus.

2. Description of the Related Art

In a fluidized-bed reactor for gas-phase polymerization of olefin(s), a fluidized bed has been formed in which a polymer powder flows by virtue of a reaction gas stream. When the polymer powder is drawn off from the reactor, it necessarily is accompanied by the reaction gas which has coexisted with the polymer powder. The reaction gas, which is composed mainly of feedstock olefin gas, may additionally contain a sub-raw material gas needed for causing a desired polymerization reaction in a reactor. In some cases, the sub-raw material gas may be obstructive to the following steps. For example, when hydrogen, which serves as a molecular weight regulator, is used as a sub-raw material gas in a multi-stage polymerization apparatus including a plurality of reactors and if hydrogen in an amount more than that required for a reaction in the following step is contained in the accompanying gas, it will become difficult to produce a polymer with a desired molecular weight and, accordingly, the range of the composition of polymers obtainable may be limited. For solving such problems, methods for separating, as much as possible, a sub-raw material gas accompanying a polymer powder drawn off from a reactor have been proposed.

For instance, U.S. Pat. No. 4,621,952 discloses a method in which two polymer settling vessel are disposed in parallel after a gas-phase polymerization reactor and a polymer powder is transferred to the following step alternately and a method using two polymer settling vessels are disposed serially after a gas-phase polymerization reactor wherein a polymer is separated in a first vessel and transferred to a second vessel and then the polymer separated is transferred to the following step. For improving the polymer separation efficiency in the first vessel in the case of using the serially-disposed two vessels, JP-A 2000-53707 discloses an approach of causing the first vessel to have a conduit with a large opening for receiving the polymer. JP-A 3-153708 discloses a method in which a settling vessel is provided with a pressure leveling line and a polymer powder settled is discharged together with a small amount of gas intermittently to the following step. U.S. Pat. No. 5,928,612 discloses a method in which a drawing-off conduit from a gas-phase polymerization vessel is directed downwards in a predetermined angle. However, these approaches require two polymer settling vessels, resulting in difficulty in continuous operations or difficulty in changing the gas exchange rate at will.

SUMMARY OF THE INVENTION

The object of the present invention is to provide:

an apparatus for continuous polymerization of olefin(s) including a plurality of serially-disposed gas-phase polymerization reactors, in which a gas accompanying a polymer powder drawn-off from an upstream reactor can be exchanged easily and at an arbitrary rate with another gas (for example, fresh olefin gas);

a method for transferring a polymer powder after exchanging a gas accompanying the polymer powder from the upstream reactor easily and at an arbitrary rate with another gas; and a method for the continuous polymerization of olefin(s) utilizing the method for transferring the polymer powder.

In a first aspect, the present invention provides an apparatus for continuous polymerization of olefin(s), comprising a plurality of serially-disposed gas-phase polymerization reactors which include a combination of an upstream reactor and a downstream reactor, the upstream and downstream reactors being adjacent to each other via a gas exchange vessel and the upstream reactor being disposed upstream of the downstream reactor, the gas exchange vessel being connected to the upstream reactor by a first transfer conduit and to the downstream reactor by a second transfer conduit, wherein the gas exchange vessel has a gas distributor plate therein, which partitions the inside of the gas exchange vessel into an upper section and a lower section, the upper section comprising:

an inlet, which is an opening of the first transfer conduit and through which a polymer powder produced in the upstream reactor is transferred to the gas exchange vessel while being accompanied by a first gas from the upstream reactor;

a gas exchange chamber, in which a polymer powder transferred from the upstream reactor is accumulated temporarily and the first gas which has been introduced from the upstream reactor together with the polymer powder and which exists in the polymer powder is exchanged at least partly with a second gas which is fed into the gas exchange vessel, and an outlet, which is an opening of the second transfer conduit and through which the polymer powder is discharged from the gas exchange chamber toward the downstream reactor; and the lower section of the gas exchange vessel comprising a gas introduction port, through which the second gas is introduced into the gas exchange vessel.

In a second aspect, the present invention provides a method for continuous polymerization of olefin(s), the method comprising polymerizing olefin(s) in the presence of a catalyst in reactors of a continuous polymerization apparatus including a plurality of serially-disposed gas-phase polymerization reactors, wherein the continuous polymerization apparatus is the apparatus according to the first aspect of the present invention, wherein the method further comprises steps of:

introducing a polymer powder produced in the upstream reactor into the gas exchange chamber of the gas exchange vessel through the first transfer conduit together with at least a part of a first gas existing in the upstream reactor;

introducing a second gas into the lower section through the gas introduction port and further introducing it into the gas exchange chamber through the gas distributor plate, thereby exchanging at least a part of the first gas existing in the polymer powder in the gas exchange chamber by the second gas; and transferring the polymer powder intermittently together with the gas existing in the polymer powder from the gas exchange chamber to the downstream reactor through the second transfer conduit.

In a third aspect, the present invention provides a method for transferring a polymer powder which is conducted in a continuous polymerization apparatus including a plurality of gas-phase polymerization reactors serially disposed, typically during a process for continuous polymerization of olefin (s) using such an apparatus, wherein the continuous polymerization apparatus is the apparatus according to the first aspect of the present invention, wherein the method comprises steps of:

introducing a polymer powder produced in the upstream reactor into the gas exchange chamber of the gas exchange vessel through the first transfer conduit together with at least a part of a first gas existing in the upstream reactor;

introducing a second gas into the lower section through the gas introduction port and further introducing it into the gas exchange chamber through the gas distributor plate, thereby exchanging at least apart of the first gas existing in the polymer powder in the gas exchange chamber by the second gas; and transferring the polymer powder intermittently together with the gas existing in the polymer powder from the gas exchange chamber to the downstream reactor through the second transfer conduit.

According to the present invention, in the continuous polymerization of olefin(s) using an apparatus including a plurality of serially-disposed gas-phase polymerization reactors, it is possible to exchange a gas accompanying a polymer powder drawn-off from an upstream reactor easily and at an arbitrary rate with another gas (typically, fresh olefin gas) and then transfer the polymer powder to a downstream reactor. Thus, it is possible to advantageously carry out continuous gas-phase polymerization of olefin(s).

DESCRIPTION OF THE PREFERRED EMBODIMENTS

Figure 1:
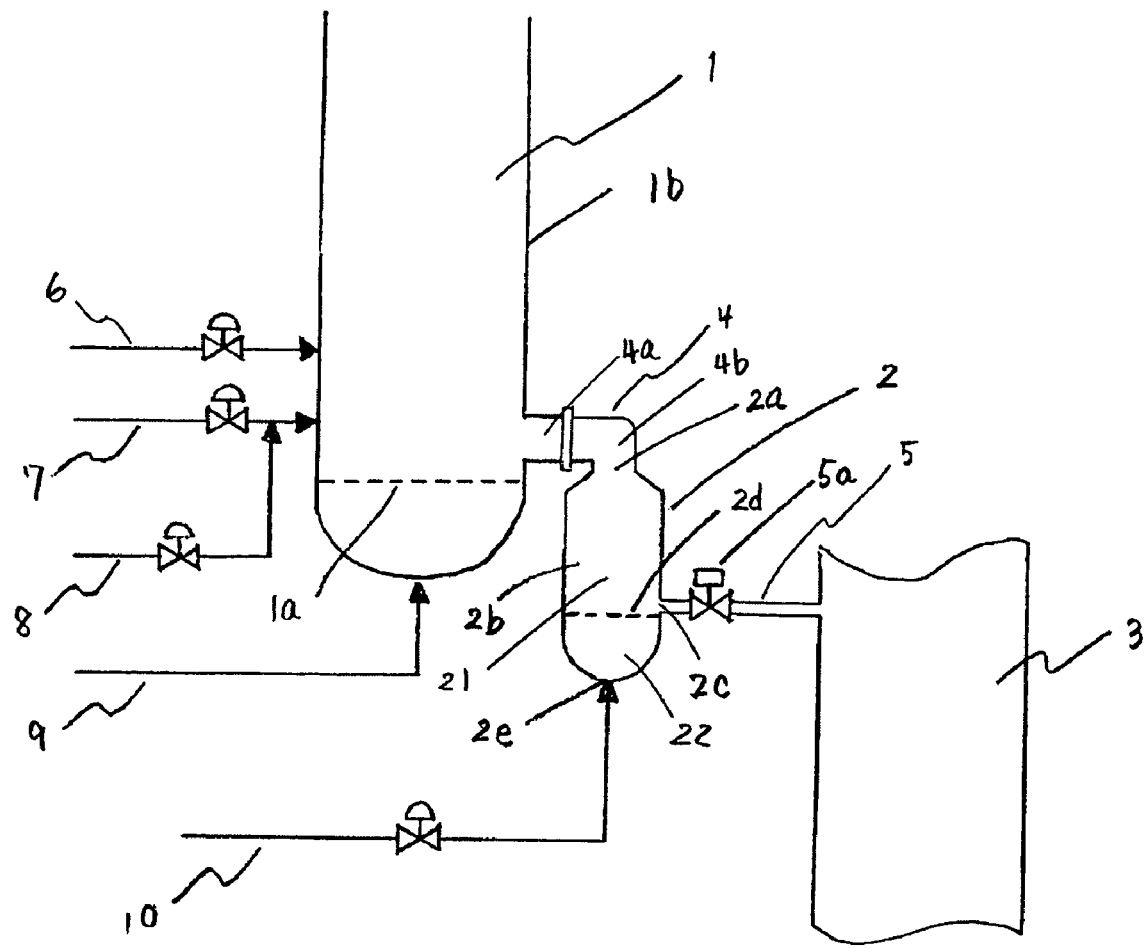
FIG. 1 is a diagram showing one example of the relationship between the gas exchange vessel and the upstream reactor in a continuous polymerization apparatus of the present invention.

The present invention is described in detail below with reference to drawings. FIG. 1 shows an example of the relationship between a gas exchange vessel and a gas-phase polymerization reactor disposed upstream of the gas exchange vessel in an apparatus according to the present invention. A fluidization grid 1a is mounted within an upstream reactor 1. To a lower portion of the reactor, a gas exchange vessel 2 is connected through a first transfer conduit 4 composed of a draw-off nozzle 4a and a connection conduit 4b. The gas exchange vessel and a downstream reactor 3 disposed downstream of the gas exchange vessel are connected by a second transfer conduit 5. In this example, the second transfer conduit is provided with a transfer control valve 5a. The gas exchange vessel typically has a top wall, a vertical side wall and a base wall. The inside of the vessel is partitioned by a gas distributor plate 2d into an upper section 21 and a lower section 22. The upper section of the gas exchange vessel includes:

an inlet 2a, which is an opening of the first transfer conduit 4 and through which a polymer powder produced in the upstream reactor 1 is transferred to the gas exchange vessel 2 while being accompanied by a first gas from the upstream reactor;

a gas exchange chamber 2b, in which a polymer powder transferred from the upstream reactor 1 is accumulated temporarily and the first gas which has been introduced from the upstream reactor together with the polymer powder and which exists in the polymer powder is exchanged at least partly with a second gas which is fed into the gas exchange vessel 2, and an outlet 2c, which is an opening of the second transfer conduit 5 and through which the polymer powder is discharged from the gas exchange chamber 2b toward the downstream reactor 3.

The lower section 22 of the gas exchange vessel 2 is provided with a gas introduction port 2e for introducing the second gas into the gas exchange vessel. The second gas (typically, olefin gas) introduced into the lower section through the gas introduction port via a feed line 10 is blown into the gas exchange chamber 2b through the gas distributor plate 2d. A polymer powder discharged into the first transfer conduit 4 from the upstream reactor 1 enters the gas exchange vessel while being accompanied by the first gas which has existed in the upstream reactor, and then is accumulated temporarily in the gas exchange chamber. The first gas which accompanies and exists in the polymer powder is exchanged in the gas exchange chamber with the second gas blown through the gas distributor plate. Following a predetermined period of gas exchange, the polymer powder is transferred to the downstream reactor 3 through the second transfer conduit 5 provided with the transfer control valve 5a.

A catalyst, an olefin gas and a sub-raw material such as hydrogen are fed into the upstream reactor 1 through a catalyst feed line 6, an olefin feed line 7 and a sub-raw material feed line 8, respectively. The polymer powder is fluidized by a circulation gas fed from a circulation gas line 9. In the upstream reactor, the olefin is polymerized to produce a polymer powder. The polymer powder produced in the upstream reactor is discharged into the gas exchange vessel 2 through the first transfer conduit 4. The first gas, which is a gas containing the olefin and the sub-raw material, is exchanged with the second gas, typically olefin gas, blown through the gas distributor plate 2d and then is transferred back to the upstream reactor 1 through the first transfer conduit 4.

In the gas exchange chamber 2b of the gas exchange vessel 2, the first gas which flowed-in from the upstream reactor 1 while accompanying the polymer powder and exists in a layer of the polymer powder is exchanged with the second gas which was introduced through the gas introduction port 2e and was distributed by the gas distributor plate 2d. By mounting the gas distributor plate, which has a structure such that gas supplied from the rear side of the plate is blown uniformly from the entire of the front side thereof, it is possible to bring the second gas into contact with the polymer powder uniformly and efficiently regardless of the rate at which the second gas is introduced. As the gas distributor plate, a porously-structured plate, such as plates with many penetrating small holes and sintered metal plates, is typically used. A plate which is structured so as to have a differential pressure characteristic for achieving uniform gas distribution in the radius direction of the gas distributor plate and not so as to allow a polymer powder to pass through the gas distribution plate is advantageously employed.

The second gas introduced into the gas exchange vessel 2 through the gas introduction port 2e is typically fresh olefin gas. The introduction amount of the second gas is desirably adjusted so as to be consumed completely in the reaction occurring in the upstream reactor 1. A reaction gas must be purged under some polymerization conditions. In such cases, the gas purged will be disposed or recovered. Although the amount of the gas accompanying the polymer powder drawn-off from the upstream reactor depends on the pressure difference between the upstream reactor 2 and the downstream reactor 3, the diameter or length of the second transfer conduit 5, and the kinds of the polymer powder and the gas, it is possible to control the exchange rate of the accompanying gas at will by adjusting the ratio of the amount of the second gas introduced to the amount of the gas accompanying the polymer powder. By controlling the exchange rate of the accompanying gas at will, it is possible to control the properties of the polymer produced and, at the same time, prevent the loss of the reaction gas purged.

The polymer powder after undergoing the gas exchange is drawn-off directly to the downstream reactor 3 with utilization of the pressure difference between the gas exchange vessel and the downstream reactor through the open/close operation of the transfer control valve 5a provided in the second transfer conduit 5 connected to the lower portion of the gas exchange chamber 2b of the gas exchange vessel 2. The level of the surface of the polymer powder layer in the gas exchange vessel is lowered by the drawing-off and, accordingly, a polymer powder flows into the gas exchange vessel from the upstream reactor 1 continuously by virtue of gravity.

Figure 2:
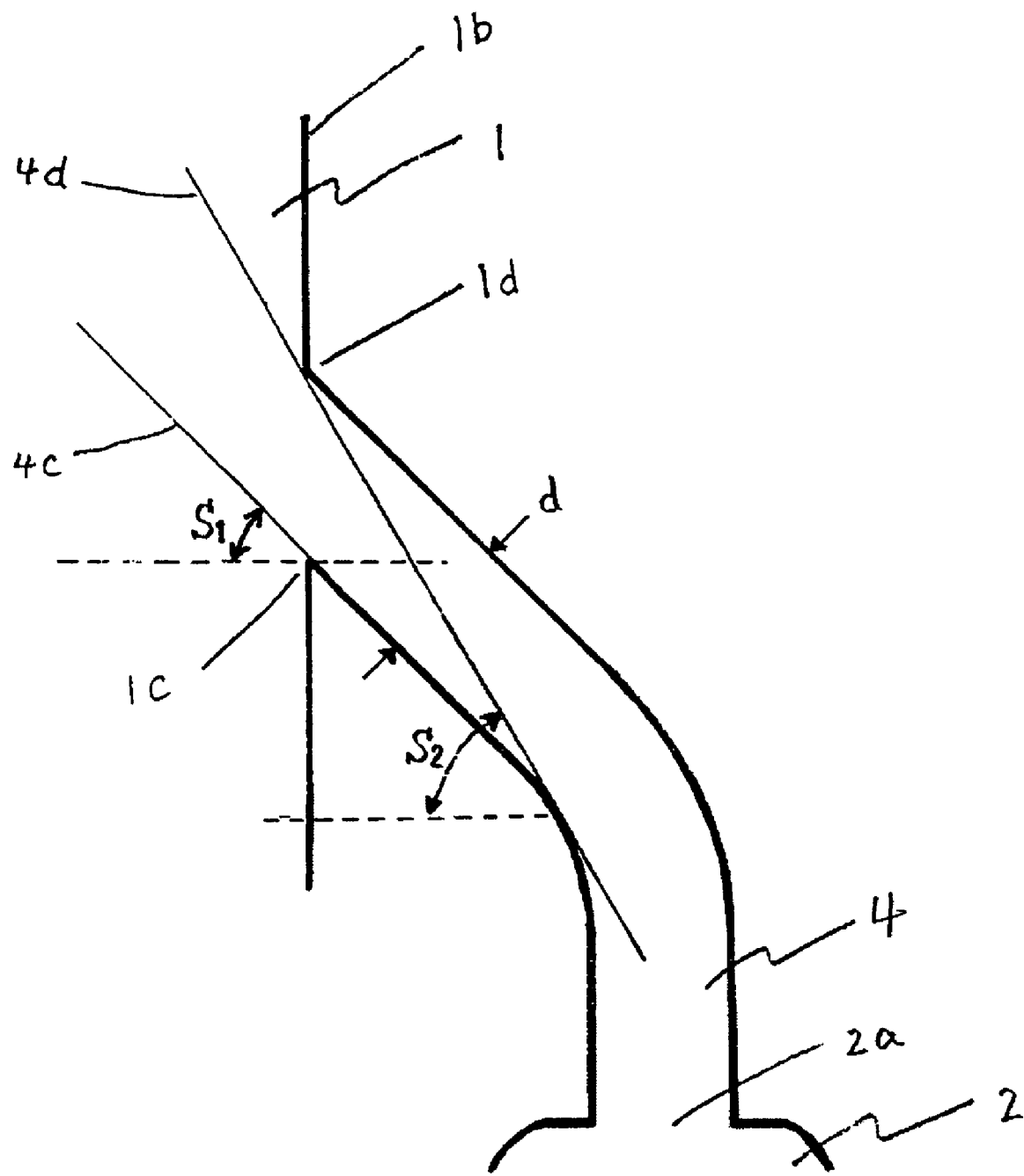
FIG. 2 is a diagram showing the relationship between the upstream reactor, the gas exchange vessel and the first transfer conduit connecting the reactor and the vessel in one example of the continuous polymerization apparatus of the present invention.

FIG. 2 shows the relationship between an upstream reactor 1, a gas exchange vessel 2 and a first transfer conduit 4 connecting the reactor and the vessel in an exemplary polymerization apparatus of the present invention. In this example, the upstream reactor has a vertical side wall 1b through which the first transfer conduit opens. In FIG. 2, $S_1$ is the magnitude (°) of an angle formed by a horizontal line and a slope line 4c of the inner bottom of the first transfer conduit at the bottom 1c of the joint of the first transfer conduit and the vertical side wall of the upstream reactor. When the inner bottom of the first transfer conduit leaves the vertical side wall of the upstream reactor while forming a straight line at point 1c, the slope line of the inner bottom of the first transfer conduit is the straight line defined by the inner bottom of the first transfer conduit. On the other hand, when the inner bottom of the first transfer conduit leaves the vertical side wall of the upstream reactor while forming a curved line at point 1c, the slope line of the inner bottom of the first transfer conduit is the tangent at point 1c of the curved line defined by the inner bottom of the first transfer conduit. $S_2$ is the magnitude (°) of an angle formed by a horizontal line and a straight line 4d which passes the top 1d of the joint of the first transfer conduit and the vertical side wall of the upstream reactor and is tangent to the inner bottom of the first transfer conduit within the portion where the inner bottom bends anglewize or roundly. The sign "d" is the inner diameter of the first transfer conduit 4. When $S_1$ and $S_2$ are determined so that the following expressions (1) and (2) are satisfied, it is possible to cause the polymer powder to flow into the gas exchange vessel smoothly from the upstream reactor through the first transfer conduit only by virtue of gravity without pressure difference.

$$0°≤S_1≤90° \quad (1)$$

$$Ar≤S_2≤90° \quad (2)$$

Where Ar is an angle of repose (°) of the polymer powder formed in the upstream reactor. The angle of repose used herein is that defined by F. A. Zenz and D. F. Othmer in "Fluidization and Fluid-Particle Systems" published in "Reinhold Chemical Engineering Series" by Reinhold Publishing Corporation, NewYork, (1960), pages 85 to 88.

A preferable $S_2$ varies depending on the inner diameter d of the first transfer conduit even if the initial inclination of the first transfer conduit 4 at its joint to the vertical side wall 1b of the upstream reactor 1, the position where the inner bottom of the first transfer conduit bends downward anglewise or roundly, and the angle at which the first transfer conduit bends are fixed. If, however, d is determined depending on $S_1$ and $S_2$ which satisfy the expressions (1) and (2) mentioned above, it is possible to cause the polymer powder to flow smoothly. "$S_1=0$" means that the first transfer conduit leaves the vertical side wall of the upstream reactor horizontally. Even in such a case, however, it is possible to cause the polymer powder to flow into the gas exchange vessel smoothly by virtue of gravity if the inner diameter d of the first transfer conduit and the position where the inner bottom of the first transfer conduit bends downward anglewise or roundly are determined so that $S_2$ satisfies the expression (2).

The capacity of the gas exchange chamber 2b of the gas exchange vessel 2 is desirably not smaller than the apparent volume of the polymer powder transferred in one intermittent transfer of the polymer powder to the downstream reactor 3, that is to say, the sum of the real volume of the polymer powder and the volume of the gas existing in the polymer powder. When the polymer powder is transferred intermittently from the gas exchange vessel, the amount of gas which remains in the polymer powder can be reduced by setting the capacity of the gas exchange chamber 2b large enough. The polymer powder is continuously in contact with the second gas in the gas exchange chamber. If the distance between the opening 2a of the first transfer conduit and the opening 2c of the second transfer conduit in the gas exchange vessel is too short or if the contact time of the polymer powder with the second gas is too short, the first gas may flow into the second transfer conduit 5 directly, or the first gas in the polymer powder may be exchanged insufficiently with the second gas. This may result in increase in the amount of the first gas which flows into the downstream reactor 3. By setting the capacity of the gas exchange chamber 2b equal to or greater than the volume of the polymer powder discharged into the second transfer conduit 5 by one intermittent operation of transferring the polymer powder from the gas exchange vessel 2, it is possible to prevent the above-mentioned undesirable phenomena.

Regarding the gas distributor plate 2d mounted in the gas exchange vessel 2, it is desirable to select one which produces a pressure loss of 0.2 kPa or more during the operation of the apparatus. Proper selection of a gas distributor plate makes it possible to distribute the second gas uniformly throughout the cross section of the gas exchange vessel even if the second gas is fed in a small amount.

The present invention provides, in the first aspect, an apparatus for the continuous polymerization of olefin(s) as described above, and it also provides, in the second aspect, a method for continuous polymerization of olefin(s) using the apparatus and, in the third aspect, a method for transferring a polymer powder from an upstream reactor to a downstream reactor which is conduct in a process for continuous polymerization of olefin(s).

The method for continuous polymerization of olefin(s) according to the second aspect of the present invention is a method comprising polymerizing olefin(s) in the presence of a catalyst in reactors of a continuous polymerization apparatus including a plurality of serially-disposed reactors, wherein the continuous polymerization apparatus is an apparatus previously described in detail, wherein the method further comprises steps of:

introducing a polymer powder produced in the upstream reactor into the gas exchange chamber of the gas exchange vessel through the first transfer conduit together with at least a part of a first gas existing in the upstream reactor;

introducing a second gas into the lower section through the gas introduction port and further introducing it into the gas exchange chamber through the gas distributor plate, thereby exchanging at least apart of the first gas existing in the polymer powder in the gas exchange chamber by the second gas; and transferring the polymer powder intermittently together with the gas existing in the polymer powder from the gas exchange chamber to the downstream reactor through the second transfer conduit.

The method for transferring a polymer powder according to the third aspect of the present invention is a method which is carried out in a process for continuous polymerization of olefin(s) conducted in a continuous polymerization apparatus including a plurality of gas-phase reactors serially disposed, wherein the continuous polymerization apparatus is an apparatus previously described in detail, wherein the method further comprises the steps of:

introducing a polymer powder produced in the upstream reactor into the gas exchange chamber of the gas exchange vessel through the first transfer conduit together with at least a part of a first gas existing in the upstream reactor;

introducing a second gas into the lower section through the gas introduction port and further introducing it into the gas exchange chamber through the gas distributor plate, thereby exchanging at least a part of the first gas existing in the polymer powder in the gas exchange chamber by the second gas; and transferring the polymer powder intermittently together with the gas existing in the polymer powder from the gas exchange chamber to the downstream reactor through the second transfer conduit.

It is easy to control the exchange rate of the first gas in the polymer powder with the second gas by adjusting the ratio of the weight of the second gas introduced through the gas introduction port 2e per unit time to the weight of the polymer powder transferred from the gas exchange chamber 2 to the downstream reactor 3 per the unit time. By controlling the exchange rate of the first gas in the polymer powder with the second gas, it is possible to adjust the concentration of a sub-raw material in the gas in the downstream reactor to obtain a desired useful polymer.

It is desirable that the polymerization pressure in the upstream reactor 1 be maintained at a pressure from 0.2 MPa to 1.0 MPa higher than the polymerization pressure in the downstream reactor 3. In the present invention, a polymer powder is transferred together with a gas composed mainly of the second gas (typically, olefin gas) fed into the gas exchange vessel 2 by gas-assisted transport utilizing the pressure difference between the gas exchange vessel and the downstream reactor. The transfer capacity depends on the pressure difference, the size of the transfer conduit, the properties of the polymer and gas to be dealt with, etc. From the viewpoint of ease of how to transfer the polymer powder, a greater pressure difference between the upstream reactor and the downstream reactor is preferred. However, because an excessively great pressure difference may result in a great difference in polymerization conditions between the upstream and downstream reactors, it is desirable that the polymerization pressure in the upstream reactor be maintained at a pressure from 0.2 MPa to 1.0 MPa higher than the polymerization pressure in the downstream reactor. It is also desirable to set the apparent volume of the polymer powder transferred in one intermittent transfer of the polymer powder to the downstream reactor 3, that is to say the sum of the real volume of the polymer powder and the volume of the gas existing in the polymer powder, less than the capacity of the gas exchange chamber 2b of the gas exchange vessel 2. In addition, it is desirable to supply the second gas into the gas exchange vessel at a rate such that the gas distributor plate can produce a pressure loss of 0.2 kPa or more. Furthermore, the polymer powder is advantageously kept in contact with the second gas for a sufficient time when the polymer powder is not transferred during the interval of the intermittent transfer operation.

The present invention provides a technique relating to continuous polymerization of olefin(s) and any olefin which can be polymerized by the action of a catalyst may be applied in the present invention. $C_2$ to $C_{10}$, especially $C_2$ to $C_8$, olefin such ethylene, propylene, or a mixture of ethylene with a $C_3$ to $C_{10}$, especially $C_3$ to $C_8$, olefin, for example, propylene, 1-butene, 1-hexene, 4-methyl-1-pentene or 1-octene is preferred. In each reactor, gas-phase polymerization is carried out in the presence of a properly selected catalyst and, if desired, a sub-raw material such as a molecular weight regulator such as hydrogen and an inert gas such as nitrogen. Examples of the catalyst include various types of metallocene catalyst and Ziegler-Natta catalysts. Polymerization conditions such as polymerization pressure, polymerization time, polymerization temperature, and the type and the amount of sub-raw materials may be appropriately chosen on the basis of knowledge of those skilled in the art. In a continuous polymerization apparatus having one or more additional reactors besides the upstream and downstream reactors sandwiching a gas exchange vessel previously described in detail, it should be noted that the structure of the additional reactors is basically the same as that of the upstream reactor, but their specifications including the capacity, the number of raw material feed lines and the style of stirring may be chosen at will.

EXAMPLES

The present invention will be described in more detail below, but the examples should not be construed to limit the scope of the invention.

Example 1

In an apparatus including an upstream reactor, a gas exchange vessel and a downstream reactor serially disposed in this order, intermittent transfer of a polymer powder was carried out, and the transferring condition of the polymer powder and the gas exchanging condition were checked.

The gas exchange vessel was in a cylindrical form having an inner diameter of 250 mm and a height of 1000 mm. The inside of the vessel was partitioned into two chambers by a gas distributor plate which was capable of exhibiting a pressure loss of 0.25 kPa in the operating state. The gas exchange vessel was provided with an introduction port for exchange gas below the gas distributor plate. It was also provided with, above the gas distributor plate, an inlet (inner diameter: 8 inches) for receiving a polymer powder from the upstream reactor and an outlet (inner diameter: 1 inches) from the gas exchange vessel toward the downstream reactor. The capacity of the portion from the gas distributor plate to the inlet was about 25 litters.

An upstream and downstream reactors of the same type having an inner volume of 1.2 m³ were disposed serially. The upstream reactor was connected to the gas exchange vessel through a draw-off nozzle with an opening with an inner diameter of 8 inches leaving horizontally the vertical side wall of the upstream reactor, and a horizontal connection conduit with an inner diameter of 8 inches following the draw-off nozzle. The draw-off nozzle and the connection conduit were 250 mm long in total. The upstream reactor formed with the nozzle and the connection conduit angles $S_1=0°$, $S_2=39°$. The gas exchange vessel and the downstream reactor were connected through a transfer conduit provided with a transfer control valve.

The inside of the upstream reactor was maintained at a pressure of 1.0 MPaG by a gas with a hydrogen-to-ethylene ratio (hereinafter, $H_2/C'_2$ ratio) of 1/10 at 70° C. Within the upstream reactor, a polymer powder having an average particle diameter of 1050 μm, a volumetric specific gravity of 0.37 g/cc and an angle of repose of 35° was fluidized fully by a gas flow with a linear velocity of 0.22 m/sec. The inside of the downstream reactor was kept in a fluidized condition by nitrogen gas with a pressure of 0.2 MPaG at 70° C. Then, the polymer powder was transferred intermittently from the upstream reactor to the downstream reactor via the gas exchange vessel while fresh ethylene gas was fed at a rate of 40 kg/hr through a gas introduction port of the gas exchange vessel. The transfer conditions of the polymer powder from the gas exchange vessel include an open time of the transfer control valve of 3 sec and a transfer interval of 30 sec. The amount of the polymer powder transferred in one intermittent transfer operation was 4.4 kg. According to the analysis of the gas in the downstream reactor, the $H_2/C'_2$ ratio was 0.15/10, which showed that the gas exchange in the gas exchange vessel was fully achieved. In addition, the flow-out condition of the polymer powder to the gas exchange vessel was good. The experimental conditions and the result of the gas analysis in the downstream reactor were summarized in Table 1.

In this example, $S_1=0°$, $S_2=39°$, and $Ar=35°$; thus, the following expressions (1) and (2) were satisfied:

$$0°\leq S_1\leq 90° \quad (1)$$

$$Ar\leq S_2\leq 90° \quad (2).$$

Examples 2 to 6

Experiments were conducted in the same manner as Example 1 except the conditions were changed as shown in Table 1. The experimental conditions and the results are summarized in Table 1.

Example 7 (Comparative)

The transfer of a polymer powder was carried out under the same conditions as Example 1 except no ethylene was introduced through the gas introduction port of the gas exchange vessel. The amount of the powder transferred by one opening operation of the transfer control valve was 5.0 kg. According to the analysis of the gas in the downstream reactor, the $H_2/C'_2$ ratio was 1/10, which showed that the gas composition in the downstream reactor was the same as that in the upstream reactor. The flow-out condition of the polymer powder to the gas exchange vessel was good.

TABLE 1

| | | Example No. | | | | | | |
|---|---|---|---|---|---|---|---|---|
| | | 1 | 2 | 3 | 4 | 5 | 6 | 7 |
| Upstream Reactor | Temperature (° C.) | 70 | 70 | 70 | 70 | 70 | 70 | 70 |
| | Pressure (MPaG) | 1.0 | 1.0 | 1.0 | 0.5 | 0.5 | 0.5 | 1.0 |
| | Gas Flow Rate (m/sec) | 0.22 | 0.22 | 0.22 | 0.22 | 0.22 | 0.22 | 0.22 |
| | $H_2/C'_2$ Ratio | 1/10 | 1/10 | 1/10 | 1/10 | 1/10 | 1/10 | 1/10 |
| Gas Exchange Vessel | Fresh $C'_2$ (kg/hr) | 40 | 10 | 19 | 30 | 19 | 19 | 0 |
| | Open Time of Transfer Control Valve (sec) | 3.0 | 3.0 | 3.0 | 3.0 | 6.0 | 3.0 | 3.0 |
| | Transfer Interval (sec) | 30 | 30 | 30 | 30 | 30 | 60 | 30 |
| | Transfer Amount (kg/transfer) | 4.4 | 4.3 | 4.3 | 3.0 | 4.4 | 2.8 | 4.3 |
| Downstream Reactor | $H_2/C'_2$ Ratio | 0.15/10 | 0.6/10 | 0.76/10 | 0.15/10 | 0.58/10 | 0.20/10 | 1.0/10 |

What is claimed is:

1. An apparatus for continuous polymerization of olefin(s), comprising a plurality of serially-disposed gas-phase polymerization reactors which include a combination of an upstream reactor and a downstream reactor, the upstream and downstream reactors being adjacent to each other via a gas exchange vessel and the upstream reactor being disposed upstream of the downstream reactor, the gas exchange vessel being connected to the upstream reactor by a first transfer conduit and to the downstream reactor by a second transfer conduit, wherein the gas exchange vessel has a gas distributor plate therein, which partitions the inside of the gas exchange vessel into an upper section and a lower section, the upper section comprising:

an inlet, which is an opening of the first transfer conduit and through which a polymer powder produced in the upstream reactor is transferred to the gas exchange vessel while being accompanied by a first gas from the upstream reactor;

a gas exchange chamber, in which a polymer powder transferred from the upstream reactor is accumulated temporarily and the first gas which has been introduced from the upstream reactor together with the polymer powder and which exists in the polymer powder is exchanged at least partly with a second gas which is fed into the gas exchange vessel, and an outlet, which is an opening of the second transfer conduit and through which the polymer powder is discharged from the gas exchange chamber toward the downstream reactor; and the lower section of the gas exchange vessel comprising a gas introduction port, through which the second gas is introduced into the gas exchange vessel;

the upstream reactor has a vertical side wall through which the first transfer conduit opens, wherein the first transfer conduit leaves the vertical side wall of the upstream reactor horizontally or downward and the first transfer conduit has an inner bottom bending anglewise or roundly at its intermediate portion, wherein the following expressions (1) and (2) are satisfied:

$$0° \leq S_1 \leq 90° \quad (1)$$

$$Ar \leq S_2 \leq 90° \quad (2)$$

where $S_1$ is the magnitude (°) of an angle formed by a horizontal line and the inner bottom of the first transfer conduit at bottom of a joint of the first transfer conduit and the vertical side wall of the upstream reactor, $S_2$ is the magnitude (°) of an angle formed by a horizontal line and a straight line which passes the top of the joint of the first transfer conduit and the vertical side wall of the upstream reactor and is tangent to the inner bottom of the first transfer conduit within the portion where the inner bottom bends anglewise or roundly, and Ar is an angle of repose of the polymer powder produced in the upstream reactor.

2. A method for transferring a polymer powder which is conducted in a continuous polymerization apparatus including a plurality of gas-phase polymerization reactors serially disposed, wherein the continuous polymerization apparatus is an apparatus defined in claim 1, wherein the method comprises steps of:

introducing a polymer powder produced in the upstream reactor into the gas exchange chamber of the gas exchange vessel through the first transfer conduit together with at least a part of a first gas existing in the upstream reactor;

introducing a second gas into the lower section through the gas introduction port and further introducing it into the gas exchange chamber through the gas distributor plate, thereby exchanging at least a part of the first gas existing in the polymer powder in the gas exchange chamber by the second gas; and transferring the polymer powder intermittently together with the gas existing in the polymer powder from the gas exchange chamber to the downstream reactor through the second transfer conduit.

3. A method for continuous polymerization of olefin(s), the method comprising polymerizing olefin(s) in the presence of a catalyst in reactors of a continuous polymerization apparatus including a plurality of serially-disposed gas-phase polymerization reactors, wherein the continuous polymerization apparatus is an apparatus defined in claim 1, wherein the method further comprises steps of:

introducing a polymer powder produced in the upstream reactor into the gas exchange chamber of the gas exchange vessel through the first transfer conduit together with at least a part of a first gas existing in the upstream reactor;

introducing a second gas into the lower section through the gas introduction port and further introducing it into the gas exchange chamber through the gas distributor plate, thereby exchanging at least a part of the first gas existing in the polymer powder in the gas exchange chamber by the second gas; and transferring the polymer powder intermittently together with the gas existing in the polymer powder from the gas exchange chamber to the downstream reactor through the second transfer conduit.

4. The method according to claim 3, wherein the ratio of the weight of the second gas introduced through the gas introduction port per unit time to the weight of the polymer powder transferred from the gas exchange vessel to the downstream reactor per the unit time is adjusted, so that the exchange rate of the first gas in the polymer powder by the second gas is controlled.

5. The method according to claim 3, wherein the polymerization pressure in the upstream reactor is maintained at a pressure from 0.2 MPa to 1.0 MPa higher than the polymerization pressure in the downstream reactor.

6. The method according to claim 3, wherein the apparent volume of the polymer powder transferred from the gas exchange vessel to the downstream reactor in one intermittent transfer is equal to or less than the capacity of the gas exchange chamber of the gas exchange vessel.

7. The method according to claim 3, wherein the second gas is introduced into the gas exchange vessel under conditions where the pressure loss caused by the gas distributor plate is 0.2 kPa or more.

* * * * *